(No Model.)

G. S. ANDRUS.
WEED CUTTER.

No. 479,612. Patented July 26, 1892.

WITNESSES:
Chas. Nida
C. Sedgwick

INVENTOR
G. S. Andrus
BY Munn & Co.
ATTORNEYS

UNITED STATES PATENT OFFICE.

GROSVENOR S. ANDRUS, OF WALLA WALLA, WASHINGTON.

WEED-CUTTER.

SPECIFICATION forming part of Letters Patent No. 479,612, dated July 26, 1892.

Application filed November 10, 1891. Serial No. 411,530. (No model.)

*To all whom it may concern:*

Be it known that I, GROSVENOR S. ANDRUS, of Walla Walla, in the county of Walla Walla and State of Washington, have invented a new and useful Improvement in Weed-Cutters, of which the following is a full, clear, and exact description.

My invention relates to an improvement in weed-cutters, and has for its object to provide an implement which will cut the roots of the weeds as the cutter travels beneath the surface of the ground; and a further object of the invention is to so construct the cutter that it will cut all the roots without turning over the ground and placing it in condition for other weeds to grow.

Another object of the invention is to construct the implement in a simple, durable, and economic manner, and to provide means whereby the cutter may be made to travel at greater or less depth beneath the surface of the ground.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in all the views.

Figure 1:
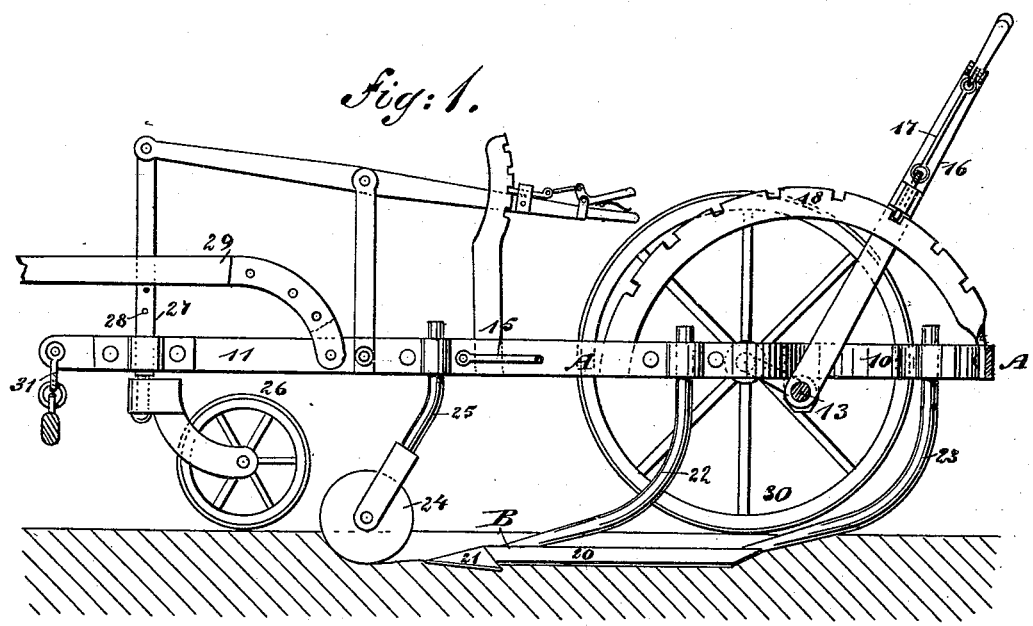
Figure 2:
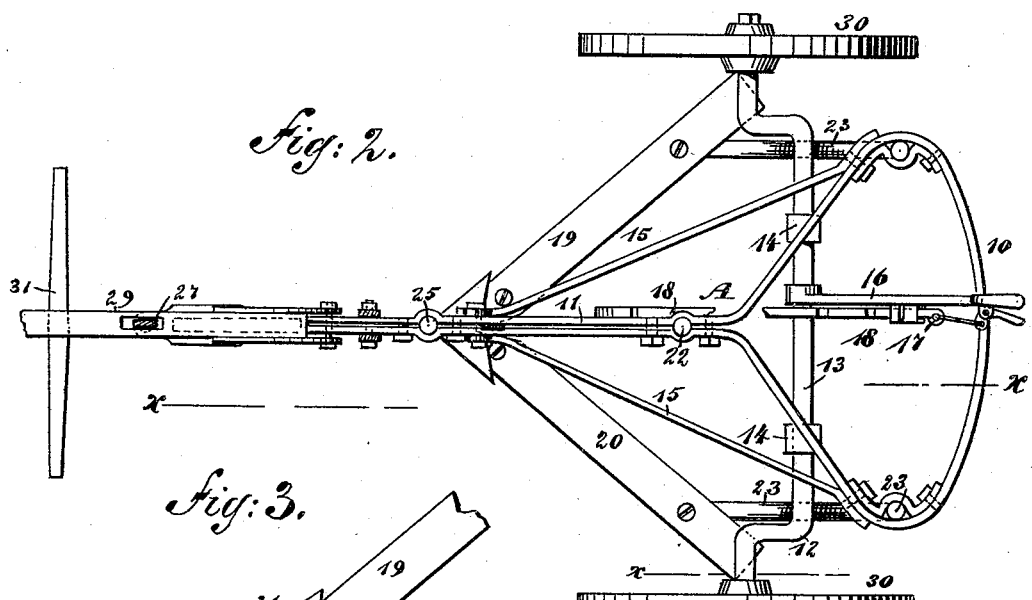
Figure 3:
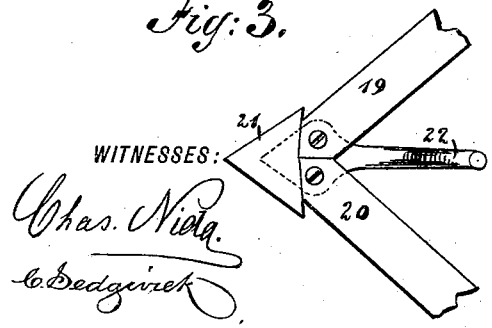

Figure 1 is a partial side elevation and a partial longitudinal section of the implement, the section being taken, practically, on the line *x x* of Fig. 2. Fig. 2 is a plan view of the implement, and Fig. 3 is a detail view of the point of the cutter.

The frame A of the implement consists of a rear essentially-oval section 10 and a front straight section 11 emanating from the central forward portion of the oval section, as is best shown in Fig. 2. This frame is preferably made of strap or bar iron bent to the oval shape at the rear, and after the oval shape is formed the bars or straps are brought together and carried forward in parallel lines to form the straight section 11. An axle 12 is provided with a central crank-arm 13, the said crank-arm being journaled in suitable bearings 14, attached to or forming an integral portion of the rear section of the frame, and the two sections of the frame are strengthened through the medium of brace-bars 15, one located at each side and attached at their forward ends to the straight section of the frame at or near the center thereof and at their rear ends to the forward outer faces of the oval section, as is likewise best shown in Fig. 2.

Within the oval section of the frame a lever 16 is rigidly attached to the crank-arm or arched portion 13 of the axle. This lever is provided with the usual hand-latch 17, adapted for engagement with a rack 18, the latter being secured to the forward section of the frame, and it also extends over the oval section, being attached to the latter at its rear portion, as shown in Fig. 1. By manipulating the lever 16 the crank-arm or arched section of the axle may be carried downward or upward to raise or to lower the frame.

The frame is especially adapted for the reception of a cutter B. This cutter consists of two blades 19 and 20, arranged to form two sides of a triangle, their inner ends being beveled off so as to form a miter-joint, as illustrated in Fig. 3, and upon the forward portion of the blades of the cutter, at their junction, the point 21 is secured, the point and the beveled forward ends of the blades being attached to the foot of an upwardly-curved standard 22, which standard at its upper extremity is passed through a suitable opening in the straight section of the frame and is rigidly held in any approved manner. A similarly-curved standard 23 is likewise attached to the rear end of each blade, the latter standards being carried upward through suitable apertures or bearings in the side portions of the oval section of the frame, at which points they are rigidly attached. The standards are curved gradually rearward at their lower ends and abruptly upward at their upper ends, the said standards being so curved that they will not act to catch or retain trash while the implement is in operation.

The blades 19 and 20 are reversible—that is, the left-hand blade may be placed upon the right-hand side, if found desirable, as the blades are removably attached to the standards—and the reversing operation is permitted by means of the pointed or beveled shape of the forward ends of the blades, and also because both side edges are sharp. The upper faces of the blades are smooth, and the bevel necessary to produce cutting-edges is formed upon their under faces. When the blades are placed in position for work they have an inclination downward.

Immediately in front of the point of the cutter a colter 24 is located, which colter cuts into the ground and through the weeds in advance of the cutter. The colter is pivoted to the lower end of a standard or upright 25, the upper end of which is secured in suitable bearings in the forward portion of the straight section of the frame.

A caster-wheel 26 is swiveled upon the lower end of an upright 27, the caster-wheel being located beneath the forward portion of the frame nearly at its forward end, and the upright 27 passes upward through a suitable bearing in the frame and is provided with a series of apertures 28. These apertures are adapted to receive one or more pins, and when the pins are properly placed in the apertures the height that the forward end of the frame shall travel from the ground is determined. The pole 29 is pivoted at its rear end upon the straight section of the frame between the bearings for the standard of the caster-wheel and the standard or upright of the colter. To the upper end of the upright of the caster-wheel is attached one end of a lever fulcrumed upon the section 11 of the frame, said lever being provided with a hand-latch adapted to engage a rack supported on the frame, whereby the caster-wheel may be raised or lowered and locked in position when desired.

It is desirable that the pole should not exert any weight upon the team, and consequently an aperture is made in the pole through which the upright 27 of the caster-wheel projects, and the pole rests upon one of the pins located in said upright.

When the lever 16 is manipulated to carry the arched section of the axle upward, the frame is elevated sufficiently to carry the cutter entirely free of the surface of the ground; but when the implement is in operation the cutter is made to enter the ground to the depth required by manipulating the lever 16 to drop the arched section of the axle more or less. The axle at its ends is provided with wheels 30, and a suitable doubletree 31 is connected in any approved manner with the forward end of the frame.

It will be observed that this implement is exceedingly simple and durable in construction, and that it is capable of convenient manipulation by one man, and that one or more blades may be carried by the axle.

Having thus described my invention, I claim as new and desire to secure by Letters Patent—

A weeding or cultivating machine comprising the frame A, formed of a bar or strap of metal bent into a horizontal oval or open form at the rear and having its ends brought together in front thereof to form the straight forward section 11, a cutter beneath the frame and having three upward-curved posts, the side post 23 of which is clipped to the ends of the oval part of the frame and the front post 22 of which is secured to the straight portion 11, supporting-wheels for the frame, and means for adjusting the frame vertically, substantially as set forth.

GROSVENOR S. ANDRUS.

Witnesses:
 JOHN L. SHARPSTEIN,
 J. S. BOYER.